United States Patent
Quinn

(10) Patent No.: US 9,352,183 B2
(45) Date of Patent: May 31, 2016

(54) BICYCLE-MOUNTED EXERCISE APPARATUS

(71) Applicant: Michael Scott Quinn, New Orleans, LA (US)

(72) Inventor: Michael Scott Quinn, New Orleans, LA (US)

(*) Notice: Subject to any disclaimer, the term of this patent is extended or adjusted under 35 U.S.C. 154(b) by 0 days.

(21) Appl. No.: 14/295,632

(22) Filed: Jun. 4, 2014

(65) Prior Publication Data

US 2015/0065310 A1    Mar. 5, 2015

Related U.S. Application Data

(60) Provisional application No. 61/874,169, filed on Sep. 5, 2013.

(51) Int. Cl.
*A63B 21/16*   (2006.01)
*A63B 69/16*   (2006.01)
(Continued)

(52) U.S. Cl.
CPC .......... *A63B 21/025* (2013.01); *A63B 21/0421* (2013.01); *A63B 21/4035* (2015.10); *A63B 21/4047* (2015.10); *A63B 23/16* (2013.01); *B62K 21/125* (2013.01); *A63B 21/16* (2013.01); *A63B 69/16* (2013.01)

(58) Field of Classification Search
CPC .................. A63B 21/00003; A63B 21/00007; A63B 21/00032; A63B 21/00083; A63B 21/00094; A63B 21/00101; A63B 21/00109; A63B 21/0012; A63B 21/00123; A63B 21/00127; A63B 21/0013; A63B 21/02; A63B 21/023; A63B 21/025; A63B 21/0407; A63B 21/0414; A63B 21/0421; A63B 21/0428; A63B 21/0435; A63B 21/045; A63B 21/0455; A63B 21/08; A63B 21/1446; A63B 21/1465; A63B 21/1469; A63B 21/1476; A63B 21/1488; A63B 21/1492; A63B 21/1496; A63B 21/15; A63B 21/151; A63B 21/159; A63B 22/0002; A63B 22/0012; A63B 22/0046; A63B 22/0048; A63B 22/0061; A63B 22/0064; A63B 22/0069; A63B 22/06; A63B 22/0605; A63B 22/0635; A63B 22/0664; A63B 2022/0005; A63B 2022/0028; A63B 2022/0041; A63B 2022/0066; A63B 2022/0074; A63B 2022/0617; A63B 23/035; A63B 23/03508; A63B 23/03516; A63B 23/03575; A63B 23/04; A63B 23/0405; A63B 23/0423; A63B 23/0476; A63B 23/0482; A63B 23/0494; A63B 23/0812; A63B 23/1209; A63B 69/16; A63B 2069/161; A63B 2069/162; A63B 2208/0228; A63B 2208/0233; A63B 2225/09; A63B 2225/093; A63B 23/1245; A63B 23/1281; A63B 23/14; A63B 23/16

USPC ........... 482/44–46; 74/543–547, 551.1–551.9
See application file for complete search history.

(56) References Cited

U.S. PATENT DOCUMENTS 627,227 A *   6/1899   Fenton ......................... 74/551.9
864,056 A *   8/1907   Altenburger ................. 74/551.2

(Continued)

*Primary Examiner* — Oren Ginsberg
*Assistant Examiner* — Gary D Urbiel Goldner
(74) *Attorney, Agent, or Firm* — Keaty Law Firm, LLC

(57) ABSTRACT

The invention relates to an apparatus for mounting exercise equipment onto handlebars of a bicycle. A hand grip device is supported by a T-shaped support member and is detachably secured with a mounting device, which is formed as a two-part clamp. The support member has elongated openings, through which the lever ends of the hand grip extend. A ball joint at the end of the support member is engaged in one of the clamp openings, while the second opening in the clamp member allows detachable engagement of the mounting member with the handlebar.

19 Claims, 5 Drawing Sheets

(51) Int. Cl.
  *A63B 23/16* (2006.01)
  *A63B 21/02* (2006.01)
  *A63B 21/04* (2006.01)
  *B62K 21/12* (2006.01)

(56) References Cited

U.S. PATENT DOCUMENTS

| | | | | |
|---|---|---|---|---|
| 1,026,215 | A * | 5/1912 | Korth | 482/50 |
| 2,848,234 | A * | 8/1958 | Brandon | 473/229 |
| 3,304,035 | A * | 2/1967 | Davis | 248/516 |
| 3,653,659 | A * | 4/1972 | Zinkin | 482/49 |
| 3,712,618 | A * | 1/1973 | Berzatzy | 473/538 |
| 3,759,512 | A | 9/1973 | Yount et al. | |
| 3,784,193 | A * | 1/1974 | Simjian | 482/147 |
| 3,803,937 | A * | 4/1974 | Johnston | 74/489 |
| 3,937,629 | A * | 2/1976 | Hamasaka | 74/551.8 |
| 3,948,361 | A * | 4/1976 | Carlson | 188/24.18 |
| 4,023,436 | A * | 5/1977 | Dodge | 74/551.3 |
| 4,084,449 | A * | 4/1978 | Kine | 74/480 R |
| 4,093,211 | A * | 6/1978 | Hughes et al. | 482/49 |
| 4,192,500 | A * | 3/1980 | Crow et al. | 482/50 |
| 4,222,285 | A * | 9/1980 | Kine | 74/480 R |
| 4,235,436 | A * | 11/1980 | Lee | 482/63 |
| 4,250,770 | A * | 2/1981 | Robertson, Jr. | 74/551.8 |
| 4,262,898 | A * | 4/1981 | Lee | 482/49 |
| 4,291,871 | A * | 9/1981 | Lippert | 482/46 |
| D264,737 | S * | 6/1982 | Cooper | D21/684 |
| 4,433,364 | A * | 2/1984 | Noble | 482/8 |
| 4,463,945 | A | 8/1984 | Spector | |
| 4,558,864 | A * | 12/1985 | Medwedeff | 273/148 B |
| 4,623,141 | A * | 11/1986 | Salvino | 482/49 |
| 4,625,963 | A | 12/1986 | Lancellotti | |
| 4,637,605 | A * | 1/1987 | Ritchie | 463/37 |
| 4,674,353 | A * | 6/1987 | Yoshigai | 74/489 |
| 4,714,245 | A * | 12/1987 | Cho | 482/82 |
| 4,726,252 | A * | 2/1988 | Dawson | 74/523 |
| 4,753,434 | A * | 6/1988 | Salvino | 482/49 |
| 4,798,377 | A | 1/1989 | White | |
| 4,799,668 | A | 1/1989 | Jansen | |
| 4,943,047 | A * | 7/1990 | Noble | 482/49 |
| 5,060,934 | A * | 10/1991 | Winston | 482/49 |
| 5,078,391 | A * | 1/1992 | Moore, Sr. | 482/59 |
| 5,087,032 | A * | 2/1992 | Gresh | 482/50 |
| 5,140,867 | A * | 8/1992 | Smith | 74/551.2 |
| 5,141,478 | A * | 8/1992 | Upper | 482/44 |
| 5,197,640 | A * | 3/1993 | Hurley et al. | 224/414 |
| 5,205,185 | A * | 4/1993 | Herman | 74/551.1 |
| D341,403 | S | 11/1993 | Wilkinson et al. | |
| D342,050 | S * | 12/1993 | Tore Gustafsson | D12/178 |
| 5,299,466 | A * | 4/1994 | Heilbron et al. | 74/502.2 |
| 5,308,299 | A * | 5/1994 | Winston | 482/49 |
| 5,372,557 | A * | 12/1994 | Ostigny | 482/49 |
| 5,431,614 | A * | 7/1995 | Jeranson | 482/57 |
| D362,418 | S | 9/1995 | Li | |
| 5,461,936 | A * | 10/1995 | Bulkeley | 74/489 |
| 5,472,400 | A | 12/1995 | Royer | |
| 5,476,431 | A | 12/1995 | Wilkinson et al. | |
| 5,487,497 | A * | 1/1996 | Kwiatkowski | 224/420 |
| 5,487,709 | A * | 1/1996 | Froelich et al. | 482/46 |
| 5,536,033 | A * | 7/1996 | Hinkston | 280/642 |
| 5,599,256 | A * | 2/1997 | Hughes, Jr. | 482/49 |
| 5,632,708 | A | 5/1997 | Wilkinson et al. | |
| 5,634,871 | A * | 6/1997 | Froelich et al. | 482/46 |
| D381,718 | S * | 7/1997 | Armstrong | D21/684 |
| D396,835 | S * | 8/1998 | Roddy | D12/178 |
| 5,797,165 | A * | 8/1998 | Armbrust | 16/430 |
| 5,904,638 | A * | 5/1999 | Habing et al. | 482/57 |
| 6,035,742 | A * | 3/2000 | Hollingsworth et al. | 74/551.9 |
| D429,454 | S | 8/2000 | Lademann, III | |
| 6,099,002 | A * | 8/2000 | Uchiyama | 280/87.021 |
| D431,060 | S | 9/2000 | Wyrick | |
| D434,356 | S * | 11/2000 | Giard | D12/178 |
| 6,371,891 | B1 * | 4/2002 | Speas | 482/57 |
| 6,421,879 | B1 | 7/2002 | Gratz et al. | |
| 6,565,485 | B1 | 5/2003 | Kinsella | |
| 6,715,779 | B2 * | 4/2004 | Eschenbach | 280/221 |
| 7,077,787 | B1 * | 7/2006 | Wiesman | 482/49 |
| 7,140,626 | B1 * | 11/2006 | Keay | 280/230 |
| 7,156,778 | B1 | 1/2007 | Blough | |
| 7,223,210 | B2 * | 5/2007 | Krul et al. | 482/57 |
| 7,438,669 | B1 * | 10/2008 | Bloom | 482/49 |
| 7,651,445 | B1 * | 1/2010 | Chen | 482/52 |
| 7,695,411 | B2 | 4/2010 | Pandozy | |
| 7,775,936 | B2 | 8/2010 | Wilkinson | |
| 7,794,369 | B1 * | 9/2010 | Rivera, III | 482/81 |
| 7,870,809 | B2 | 1/2011 | Rice | |
| D633,157 | S | 2/2011 | Knapp | |
| 7,967,313 | B1 * | 6/2011 | Eggert | 280/224 |
| 8,020,829 | B1 * | 9/2011 | Tamayori | 248/447.2 |
| D647,434 | S * | 10/2011 | Chambers et al. | D12/114 |
| 8,075,453 | B1 | 12/2011 | Wilkinson | |
| 8,500,608 | B1 | 8/2013 | Bonomi | 482/101 |
| D694,577 | S * | 12/2013 | Lynn et al. | D7/394 |
| 8,915,824 | B2 * | 12/2014 | Roberts | 482/49 |
| 8,926,477 | B2 * | 1/2015 | Lynn | 482/49 |
| 2003/0155745 | A1 * | 8/2003 | Everett | 280/642 |
| 2004/0041367 | A1 * | 3/2004 | Everett | 280/642 |
| 2004/0176218 | A1 * | 9/2004 | Fan | 482/57 |
| 2005/0221960 | A1 * | 10/2005 | Miyamaru et al. | 482/57 |
| 2005/0233866 | A1 * | 10/2005 | Miyamaru et al. | 482/57 |
| 2005/0239608 | A1 * | 10/2005 | Somwong | 482/57 |
| 2006/0021830 | A1 * | 2/2006 | Lassanske et al. | 188/2 D |
| 2006/0079382 | A1 * | 4/2006 | Lassanske et al. | 482/63 |
| 2006/0234840 | A1 * | 10/2006 | Watson et al. | 482/61 |
| 2007/0001422 | A1 * | 1/2007 | Kraus | 280/200 |
| 2007/0012136 | A1 * | 1/2007 | Burner et al. | 74/502.2 |
| 2010/0056348 | A1 * | 3/2010 | James et al. | 482/127 |
| 2010/0255969 | A1 * | 10/2010 | Long | 482/141 |
| 2013/0090215 | A1 * | 4/2013 | Roberts | 482/46 |
| 2013/0130798 | A1 * | 5/2013 | Nir et al. | 463/36 |

* cited by examiner

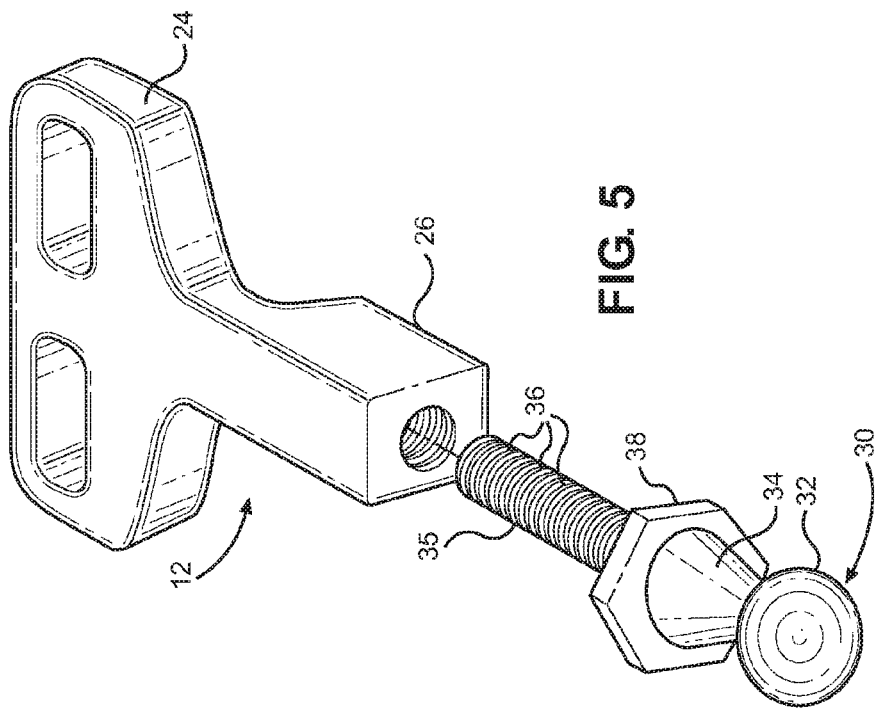
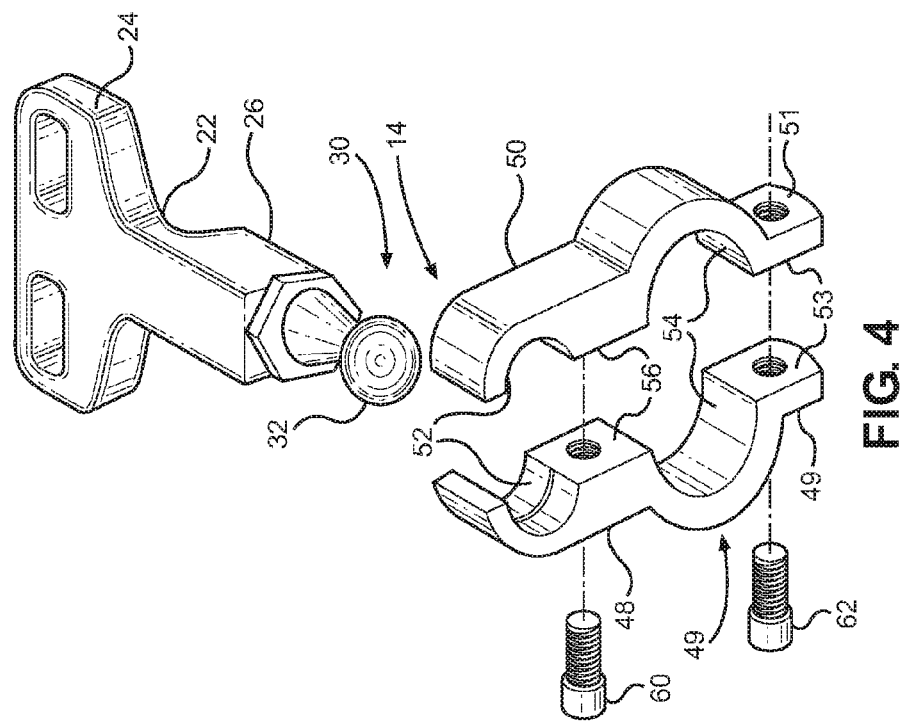

BICYCLE-MOUNTED EXERCISE APPARATUS

CROSS-REFERENCE TO RELATED APPLICATIONS

This application is a nonprovisional application based on my provisional patent application Ser. No. 61/874,169 filed on Sep. 5, 2013 entitled "Exercise apparatus for bikes," the full disclosure of which is incorporated by reference herein and priority of which is hereby claimed.

BACKGROUND OF THE INVENTION

The present invention relates to methods and an apparatus of mounting exercise equipment on to handle bars of a manually driven vehicle. More particularly, the present invention relates to methods and an apparatus for mounting squeeze grip exercise equipment on to handle bars of pedal driven vehicles such as bicycles and stationary bicycles.

Several possibly relevant patents have issued that are directed generally to this concept of incorporating an exercising device into the handlebar of a bicycle. The following table includes examples of such patents, each patent contained in the table being incorporated herein by reference.

| US Patent No. | TITLE | ISSUE DATE (mm-dd-yyyy) |
|---|---|---|
| 4,798,377 | BICYCLE HANDLE BAR GRIP WITH EXERCISE | 1/17/1989 |
| 4,799,668 | BICYCLE MOUNTED EXERCISE DEVICE | 1/24/1989 |

Limitations in exercise equipment exist in that manually driven vehicles such as bicycles and stationary bicycles are limited to exercising the lower extremities without engaging an individual's upper torso. This lack of engagement includes musculature associated with an individual's upper extremities such as arms, wrists, and fingers. This failure to engage both the upper and lower muscle groups of an individual severely limits the efficacy of cycling as a muscle-building and aerobic exercise.

BRIEF SUMMARY OF THE INVENTION

The present invention overcomes shortcoming of prior bicycle-mounted exercise devices in a simple and straightforward manner. The hand exercise apparatus of this invention is configured for detachable mounting on a handlebar of a bicycle. The apparatus comprises a squeeze grip exercise device having a pair of grip handles, each grip handle being mounted on one end of a lever. A resistance spring is formed by a coiled middle part of the lever.

The apparatus has a means for mounting the squeeze grip exercise device on the handlebar of a bicycle. The mounting means comprising a support member configured to support the squeeze grip exercise device and a mounting member configured for detachable attachment to the handlebar and the support member. The support member has a generally T-shaped body, a distant portion and a proximate portion extending transversely to a longitudinal axis of the distant portion. The proximate portion is configured for engagement with the mounting member, while the distant portion is provided with a pair of spaced-apart elongated openings extending substantially parallel to a longitudinal center axis of the distant portion. Opposite ends of the lever move within the elongated openings as the user squeezes the hand grip device.

The proximate portion has a free end and a ball joint member with a stem is engageable with the free end. The stem can be partially threaded to allow the stem to extend to a desired distance from the proximate end.

The mounting member comprises a two-portion clamp device configured for engaging the ball joint member and the handlebar. The clamp device comprises a pair of detachable clamping portions formed as mirror images of each other. The clamping portions define a first opening configured for receiving the ball joint member in a free rotational engagement and a second opening configured for clamping about the handlebar.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein:

FIG. 4 is an exploded view of the support member and the mounting member.

FIG. 5 is a perspective view of the support member.

DETAIL DESCRIPTION OF THE INVENTION

Figure 1:
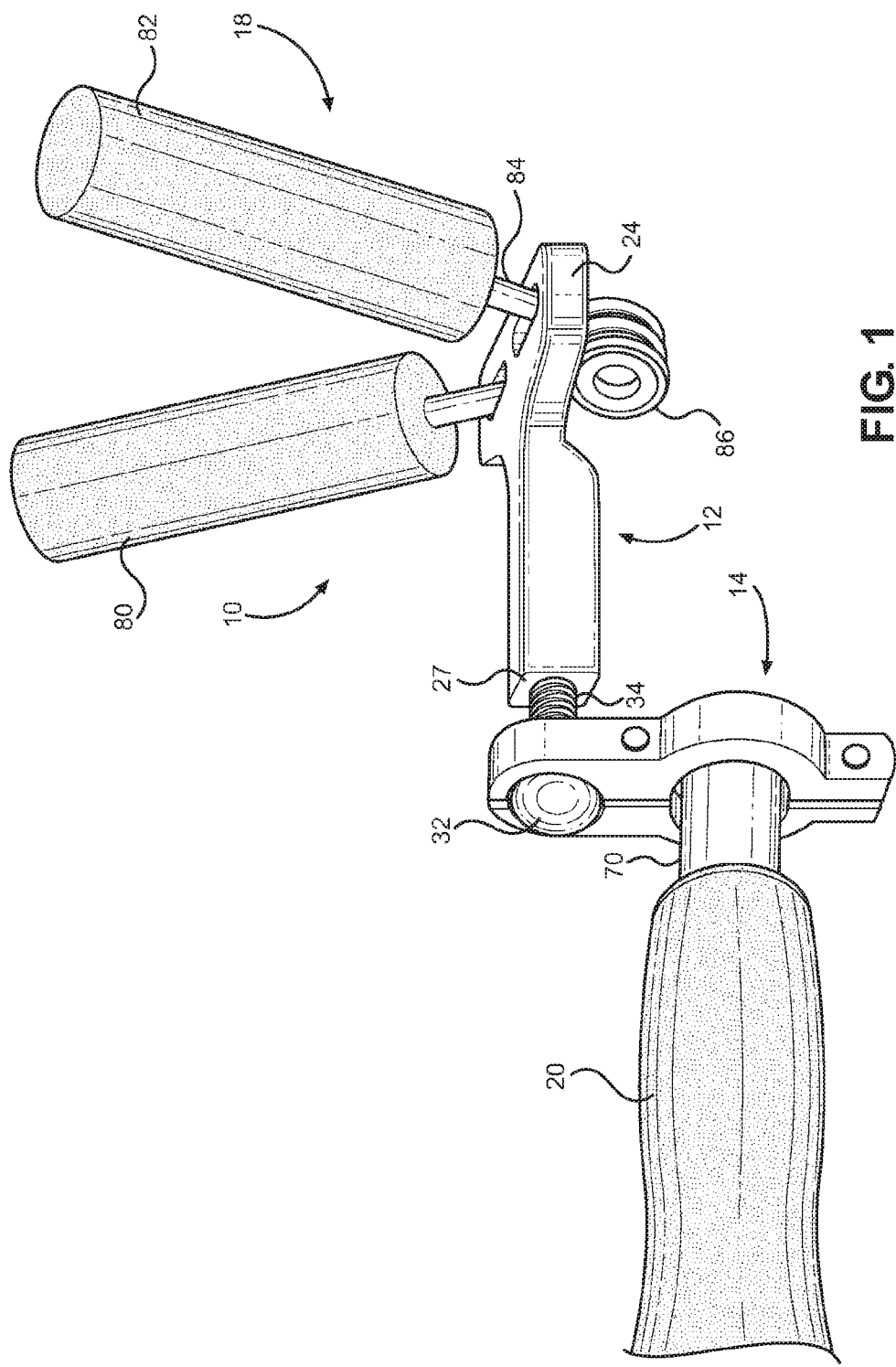
FIG. 1 is a perspective view of the exercise apparatus according to the present invention mounted on a bicycle handlebar.
Figure 3:
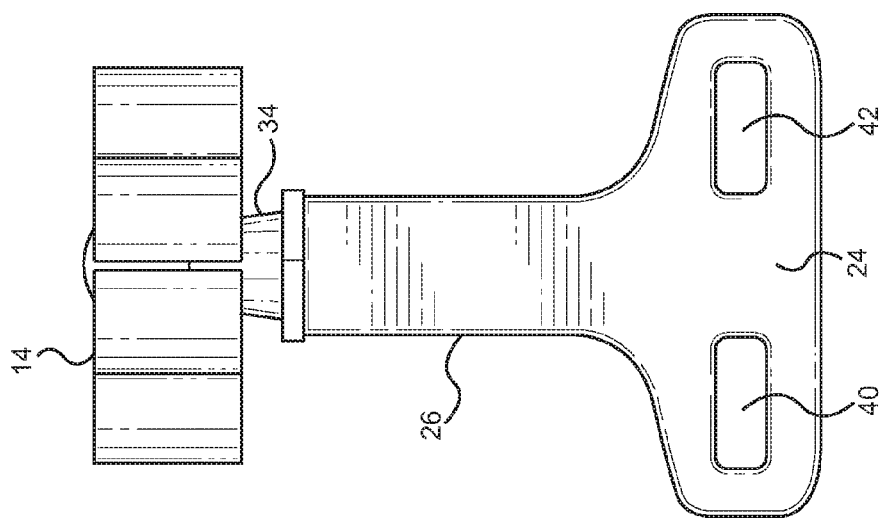
FIG. 3 is a top view of the support member and the mounting member.

Turning now to the drawings in more detail, numeral 10 designates the exercise apparatus of the present invention. The exercise apparatus 10 comprises a means for mounting a squeeze grip exercise device 18 on a handlebar 20 of a bicycle. The means for mounting comprises a support member 12, a mounting member 14, and an optional handlebar extension member 16.

The support member 12 comprises a generally T-shaped body 22 having a distant portion 24 and a proximate portion 26 extending transversely to a longitudinal axis of the distant portion 24. In one aspect of the invention, the distant portion 24 is unitary continuously formed with the proximate portion 24.

A free end 27 of the proximate portion 26 carries a ball joint member 30, which has a generally spherical part 32 and a stem 34 affixed to the spherical part 32. At least a part 35 of the stem 34 can be provided with exterior threads 36, which are configured to engage with matching interior threads (not shown) in the proximate portion 26. A nut 38 is secured along the stem 34 to delimit extension of the threaded part 35 into the proximate portion 26. The threaded stem 34 allows extension of the exercise device 18 toward and away from the handlebar 20.

The distant portion 24 is provided with a pair of spaced-apart openings 40, 42. The openings 40 and 42 are mirror images of each other. In the exemplary embodiment shown in the drawings, the openings 40 and 42 are formed as longitudinal slots extending substantially parallel to a longitudinal center axis of the distant portion 24. The openings 40, 42 are configured to engage with the exercise device 18, as will be explained in more detail hereinafter.

The mounting member 14 comprises a two-portion clamp device 46 configured for engaging the spherical part 32 and the handlebar 20. The clamp device 46 comprises a pair of clamping portions 48, 50, which are formed as mirror images of each other. Each of the clamping portions 48 and 50 has a first concave part 52 and a second concave part 54 separated by a converging middle part 56. The middle part 56 has a flat face. The first concave parts 52 form a first clamp opening 55, while the second concave parts 54 form a second clamp opening 57, when the clamp portions are joined together. The clamp openings 55, 57 form split-ring openings.

Figure 2:
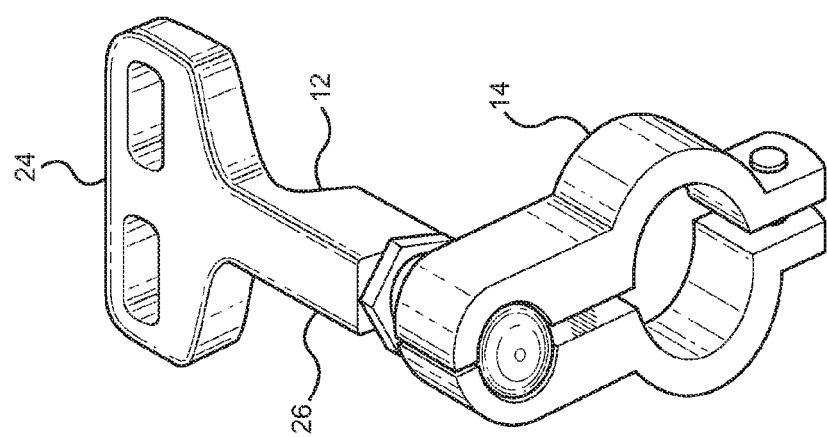
FIG. 2 is a perspective view of the support member and the mounting member of the apparatus of the present invention.

The flat faces of the middle part of the gripping portion 48 and the gripping portion 50 are positioned adjacent and substantially parallel to each other when the gripping portion 48 and 50 are engaged together to form the mounting member 14. This position of the mounting member 14 is shown in FIG. 2. The middle parts 56 are provided with openings configured for receiving a securing bolt 60 therein.

An outwardly extending flange 49 is formed on the gripping portion 48. A mirror image outwardly extending flange 51 is formed on the gripping portion 50. The flanges 49 and 50 are each provided with a flat adjoining face 53. When the gripping portions 48 and 50 are joined together, as shown in FIG. 2, the faces 53 come together to close the gripping device 46 and form a substantially cylindrical opening with the second concave parts 54. A second securing bolt 62 is configured for positioning within aligned openings formed in the flanges 49, 51.

The second concave parts 54 are configured for engaging the handlebar 20, while the first concave parts 52 are configured for engaging the spherical part 32 adjacent the stem 34. When engaged between the first concave parts 52, the spherical part 32 freely rotates in the gripping portion 48. In one aspect of the invention the first concave parts 52 form a smaller diameter opening than the opening formed by the second concave parts 54.

Figure 6:
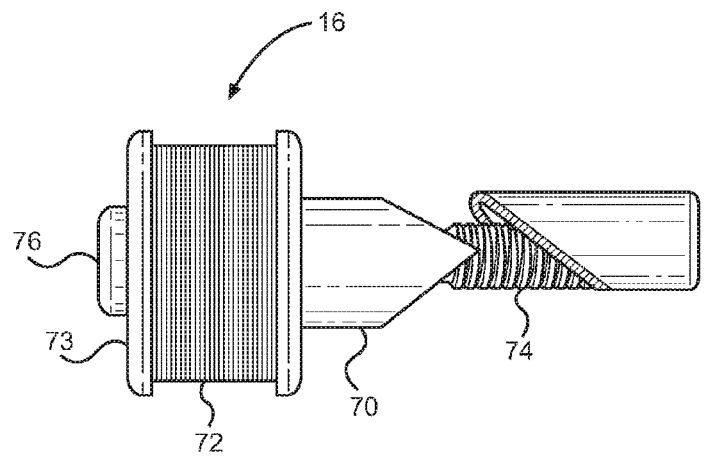
FIG. 6 is broken-away view of a handlebar engagement member.
Figure 7:
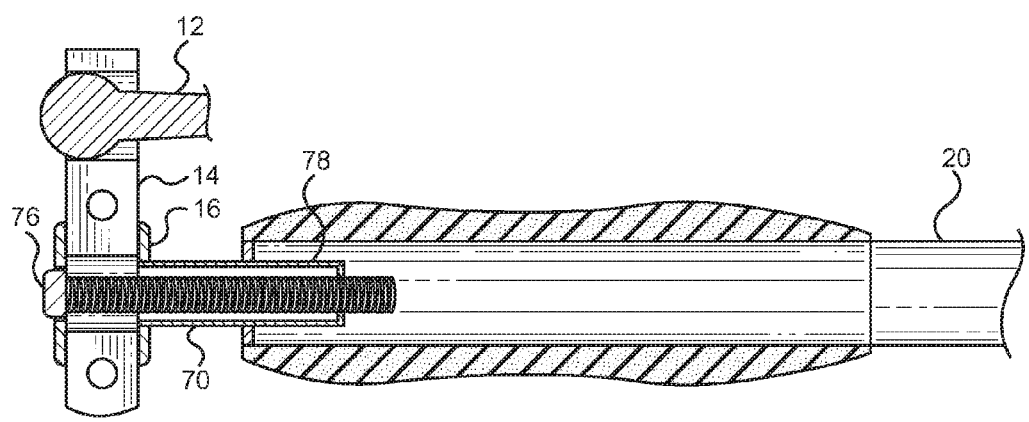
FIG. 7 is a cross-section view of the engagement member positioned on the bicycle handlebar.
Figure 8:
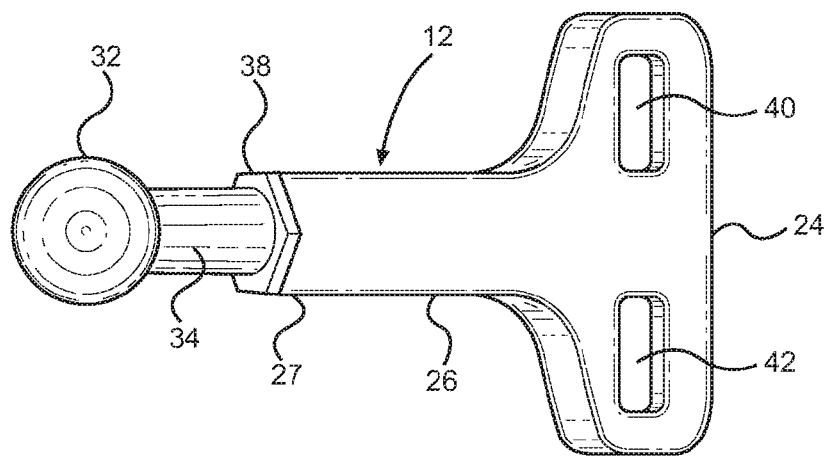
FIG. 8 is a plan view of the support member.
Figure 9:
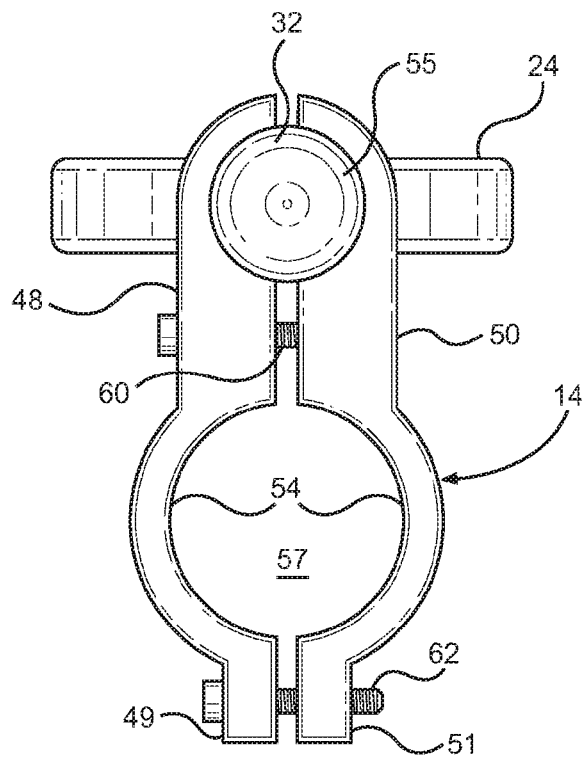
FIG. 9 is an end view of the mounting member engaged with the support member.

Turning now to FIGS. 6 and 7, the optional handlebar extension member 16 will be described in more detail. As can be seen in the drawings, the handlebar extension member 16 comprises a substantially cylindrical hollow engagement portion 70 and an enlarged diameter hollow head portion 72 coaxially affixed to the engagement portion 70. An exteriorly threaded bolt 74 is fitted inside the extension portion 70 and the head portion, extending co-axially therethrough. A bolt head 76 extends outwardly from an end 73 of the head portion 72.

The bolt 74 is configured to engage inner threads formed in an opening 78 of the handlebar 20. The treaded engagement between the bolt 74 and the inner threads of the opening 78 allow gradual movement of the extension member 16 relative to the handlebar 20. When the extension member 16 is used, the head portion 72 of the extension member 16 is fitted in the split-ring opening formed by the second concave portions 54, thus securing the mounting member 14 on the extension member 16.

The hand exercise device 18 comprises a pair of grip handles 80, 82, each of which is mounted around one end of a lever 84. A middle part 86 of the lever 84 is coiled into a spring, which offers resistance when the grip handles 80, 82 are squeezed by the user. The middle part 86 extends a distance from the grip handles 820, 82, which allows a portion of the lever between the grip handles and the coiled part being exposed. The hand exercise device 18 can have between 100 and 300 lbs at the spring. The levers 84 are received in the elongated openings 40, 42 allowing the levers 84 to move within the openings 40, 42, as the user applies the squeezing force on the grip handles 80, 82.

One of the benefits of using the hand grip device is that the user's hand endurance is automatically increased because the user can increase the quantity of force that the hands can apply. The user can also increase endurance by increasing the length of time that the hand exercise device 18 is used during biking. The hand grips also increases hand strength, where the user trains to increase the power of both fingers and the wrists. Hand grips can also improve dexterity.

Depending on the desired application the hand exercise apparatus 10 can be mounted on the left side or the right side of the handlebar 20. Alternatively, two exercise apparatuses 10 can be used, each mounted on the end of the handlebar 20. The apparatus 10 is detachably mounted on the handlebar 20 and be easily removed, re-positioned, or moved from one side of the handlebar to the other. The apparatus 10 can be positioned in any location along the length of the handlebar using the mounting member or the handlebar extension member. The bicycle on which the apparatus 10 is mounted can be stationary or movable, depending on the user's preference.

Many changes and modifications can be made in the present invention without departing from the spirit thereof. I, therefore, pray that my rights to the present invention be limited only by the scope of the appended claims.

I claim:

1. A hand exercise apparatus mountable on a handlebar of a bicycle, comprising a squeeze grip exercise device and a means for mounting the squeeze grip exercise device on the handlebar of a bicycle, said mounting means comprising a support member configured to support the squeeze grip exercise device, a mounting member configured for detachable attachment to the handlebar and the support member, and a handlebar extension member configured for detachable securing between the mounting member and a distal end of the handlebar, said handlebar extension member comprising a substantially cylindrical hollow engagement portion, an enlarged diameter hollow head portion coaxially affixed to the engagement portion, and an exteriorly threaded bolt fitted inside the extension portion and the head portion, said bolt extending through the head portion, through the engagement portion and into an end of the handlebar.

2. The apparatus of claim 1, wherein said bolt is configured for engagement with matching interior threads of the handlebar.

3. The apparatus of claim 1, said squeeze grip exercise device comprising a pair of grip handles, each grip handle being mounted on one end of a lever, said lever having a middle part coiled into a spring.

4. The apparatus of claim 3, said support member comprising a T-shaped body having a distant portion and a proximate portion extending transversely to a longitudinal axis of the distant portion, said proximate portion being configured for engagement with the mounting member.

5. The apparatus of claim 4, said distant portion is provided with a pair of spaced-apart elongated openings extending substantially parallel to the longitudinal axis of the distant portion.

6. The apparatus of claim 5, wherein each of said elongated openings is configured to receive at least a portion of the lever therethrough.

7. A hand exercise apparatus mountable on a handlebar of a bicycle, comprising a squeeze grip exercise device and a means for mounting the squeeze grip exercise device on the handlebar of a bicycle, said mounting means comprising a support member configured to support the squeeze grip exercise device and a mounting member configured for detachable attachment to the handlebar and the support member, the squeeze grip exercise device comprising a pair of grip handles, each grip handle being mounted on one end of a lever, said lever having a middle part coiled into a spring, said support member comprising a T-shaped body having a distant portion and a proximate portion extending transversely to a longitudinal axis of the distant portion, said proximate portion being configured for engagement with the mounting member, said proximate portion comprising a free end and a ball joint member carried by the free end.

8. The apparatus of claim 7, said ball joint member is supported by a stem affixed to the free end of the proximate portion.

9. The apparatus of claim 8, wherein at least a part of the stem is provided with exterior threads, the exterior threads being configured to engage with matching interior threads formed in the proximate portion allowing extension of the squeeze grip exercise device toward and away from the handlebar.

10. The apparatus of claim 7, wherein the mounting member comprises a two-portion clamp device configured for engaging the ball joint member and the handlebar.

11. The apparatus of claim 10, wherein the clamp device comprises a pair of clamping portions formed as mirror images of each other, said clamping portions defining a first opening configured for receiving the ball joint member in a free rotation engagement, and a second opening configured for engaging the handlebar.

12. The apparatus of claim 11, wherein the first opening is defined by a pair of mirror-image first concave parts of each of the clamping portions.

13. The apparatus of claim 12, wherein the second opening is defined by a pair of mirror-image second concave parts of each of the clamping portions.

14. The apparatus of claim 11, wherein the first opening is separated from the second opening by a converging middle part.

15. A hand exercise apparatus mountable on a handlebar of a bicycle, comprising:
a squeeze grip exercise device, said squeeze grip exercise device comprising a pair of grip handles, each grip handle being mounted on one end of a lever, said lever having a middle part coiled into a spring;
a support assembly for mounting the squeeze grip exercise device on the handlebar of a bicycle, said support assembly comprising a support member configured to support the squeeze grip exercise device and a mounting member configured for detachable attachment to the handlebar and the support member, said support member comprising a T-shaped body, a distant portion and a proximate portion extending transversely to a longitudinal axis of the distant portion, said proximate portion being configured for engagement with the mounting member, said distant portion being provided with a pair of spaced-apart elongated openings extending substantially parallel to the longitudinal axis of the distant portion and receiving at least a portion of the lever therethrough, said proximate portion comprising a free end and a ball joint member carried by the free end, said ball joint member being supported by a stem affixed to the free end of the proximate portion;
said mounting member comprising a two-portion clamp device configured for engaging the ball joint member and the handlebar, the clamp device comprising a pair of detachable clamping portions formed as mirror images of each other, said clamping portions defining a first opening configured for receiving the ball joint member in a free rotational engagement and a second opening configured for engaging the handlebar.

16. The apparatus of claim 15, wherein the first opening is defined by a pair of mirror-image first concave parts of each of the clamping portions, the second opening is defined by a pair of mirror-image second concave parts of each of the clamping portions, and wherein the first opening is separated from the second opening by a converging middle part.

17. The apparatus of claim 15, wherein at least a part of the stem is provided with exterior threads, the exterior threads being configured to engage with matching interior threads formed in the proximate portion allowing extension of the squeeze grip exercise device toward and away from the handlebar.

18. The apparatus of claim 15, comprising a handlebar extension member configured for detachable securing between the mounting member and a distal end of the handlebar.

19. The apparatus of claim 18, said handlebar extension member comprising a substantially cylindrical hollow engagement portion, an enlarged diameter hollow head portion coaxially affixed to the engagement portion, and an exteriorly threaded bolt fitted inside the extension portion and the head portion, said bolt extending through the head portion, through the engagement portion and into an end of the handlebar, said bolt being configured for engagement with matching interior threads of the handlebar.

\* \* \* \* \*